United States Patent Office 3,102,078
Patented Aug. 27, 1963

3,102,078
WATER-DISPERSIBLE VITAMIN PREPARATIONS
Charles D. Robeson, Rochester, N.Y., assignor to Eastman Kodak Company, Rochester, N.Y., a corporation of New Jersey
No Drawing. Filed Jan. 13, 1961, Ser. No. 82,378
11 Claims. (Cl. 167—81)

This invention relates to vitamins. More particularly, it relates to water-soluble preparations of normally water-insoluble vitamins.

It is well known that certain naturally occurring vitamins, the fat-soluble vitamins, particularly vitamins A, D and E, are water-insoluble. This fact has led to a substantial amount of effort in the vitamins art directed towards obtaining water solutions of these vitamins. In general such effort has been predicated on the principle of a solubilizing agent.

Thus, Freedman et al. in U.S. Patent No. 2,518,230 and Zentner et al. in U.S. Patent No. 2,524,247 teach that fat-soluble vitamins are water solubilized by hydroxy-polyoxyethylene ethers of aliphatic fatty alcohols. Freedman in U.S. Patent No. 2,417,299 employs as solubilizing agents for fat-soluble vitamins polyoxyethylene ethers of partial, fatty acid esters of polyhydric alcohols. Rawlins in U.S. Patent No. 2,541,285 discloses polyethylene glycol esters of straight chain aliphatic acids as water solubilizing agents for fat-soluble vitamins.

In each case, however, in order to prepare clear aqueous solutions, the weight concentration of the water solubilizing agent must be at least 3 to 10 times that of the fat-soluble vitamin. Thus, the vitamin preparation is substantially diluted with non-vitamin material even before dilution with water. The vitamin potencies of such preparations either with or without water are inherently low. Hence, when administering high or massive dosages of these vitamin preparations, relatively large quantities must be employed. This is a definite disadvantage in the case where the preparation is to be injected subcutaneously.

A general object of this invention is to provide an improved water-soluble preparation of a fat-soluble vitamin.

More particularly, an object of this invention is to provide a water-soluble preparation of a fat-soluble vitamin, which inherently has high vitamin potency.

These and other objects which may appear as this specification proceeds are achieved by this invention.

In summary, this invention involves water-soluble preparations comprising a normally water-insoluble, fat-soluble vitamin composition and a water solubilizing agent which itself has a fat-soluble vitamin activity. This fat-soluble vitamin activity may be the same as, or different from, that of the fat-soluble vitamin composition being solubilized. In particular this invention comprises a water-soluble preparation consisting essentially of a fat-soluble vitamin composition and a highly water-soluble, vitamin E active, tocopherol derivative. These preparations can be dissolved in water to form stable, aqueous solutions of enhanced vitamin potency. Since the solubilizing agent itself is a biologically active form of vitamin E, the compositions of this invention are useful in providing high potency aqueous solutions of fat-soluble vitamins for parenteral injections, for fortifying poultry drinking water and for spray application to animal feeds.

The fat-soluble vitamin compositions of this invention include the fat-soluble vitamins taken individually and together in various combinations. Examples of fat-soluble vitamins are the vitamin A esters, particularly vitamin A palmitate, and the vitamin E materials, such as α-tocopherol and α-tocopheryl acetate.

The highly water-soluble, vitamin E active, tocopherol derivative of this invention is preferably a highly water-soluble, vitamin E-active, polyoxyalkylene glycol ester of a vitamin E-active tocopheryl ester of a dicarboxylic acid. Representative of such an ester is the vitamin E-active, polyoxyethylene glycol ester of a vitamin E-active tocopheryl ester of a dicarboxylic acid wherein the polyoxyethylene glycol moiety of the ester, sometimes merely referred to as the polyethylene glycol moiety of the ester, has a molecular weight in a range from about 600 to about 6000, and preferably from about 600 to about 1500. Such an ester and a process for preparing the same are disclosed by Cawley and Stern in their U.S. Patent No. 2,680,749. An example of such an ester and one which has been found to be particularly effective is α-tocopheryl polyoxyethylene glycol (1000) succinate, a polyoxyethylene glycol ester of α-tocopheryl succinate wherein the polyoxyethylene glycol moiety of the molecule has an average molecular weight of about 1000. α-Tocopheryl polyoxyethylene glycol (1000) succinate can be dissolved in water at concentrations of about 20% by weight to make clear solutions. These solutions contain an equivalent of approximately 60 milligrams of α-tocopherol per milliliter. By incorporation of α-tocopherol or α-tocopheryl acetate into these solutions, stable, clear solutions of increased vitamin E potency (approximately 120 mg./cc.) can be obtained. By incorporation of, for example, vitamin A palmitate into these solutions, stable, clear solutions of both vitamin E and vitamin A activity can be obtained.

Concentrations of components in the water-soluble preparations and aqueous solutions of this invention may vary considerably. In general the concentration of the solubilizing agent must be sufficient to establish and maintain the selected quantity of fat-soluble vitamin composition apparently dissolved in the selected quantity of water. In general, clear vitamin E solutions are obtained when the water-soluble preparation consists essentially of from about one to about three parts by weight of α-tocopherol acetate and from about nine to about seven parts by weight of α-tocopheryl polyoxyethylene glycol (1000) succinate and for every ten parts by weight of this water-soluble preparation there is at least about thirty parts by weight of water. Also, clear vitamins A and E solutions are obtained when the water-soluble preparation consists essentially of from about one to about three parts by weight of vitamin A palmitate and from about nine to about seven parts by weight of α-tocopheryl polyoxyethylene glycol (1000) succinate and for every ten parts by weight of this water-soluble preparation there is at least about six parts by weight of water.

The preparation of the water-soluble compositions of this invention depends somewhat on the physical state of the solubilizing agent. If solid at room temperature, as in the case of the higher molecular weight esters, particularly α-tocopheryl polyoxyethylene glycol (1000) succinate, the agent is preferably melted and the fat-soluble vitamin component is then added to it and mixed, the composition cooled and, if solid, comminuted or the composition spray cooled to form beadlets. If liquid at room temperature, as in the case of the lower molecular weight esters, the fat-soluble vitamin component is merely added to it. The water-soluble compositions of this invention can also be made by dissolving the fat-soluble vitamin component in the liquid or molten solubilizing agent and then admixing the solution with water to form stable, aqueous solutions or concentrates which can be diluted with water at the time of use or which can be spray dried to give water-soluble solid products.

To enable various features, advantages and concepts of this invention to be demonstrated, the following examples are presented. It is intended that these examples be regarded as illustrative and not restrictive.

Example 1

This example illustrates the preparation of a high potency vitamin E, water-soluble composition according to this invention. This composition, it will be observed, formed a stable, aqueous solution upon addition of water thereto.

A warm solution of α-tocopheryl acetate in α-tocopheryl polyoxyethylene glycol (1000) succinate was prepared by melting 10 grams (7.6 parts by weight) of the α-tocopheryl polyoxyethylene glycol (1000) succinate and then admixing therewith 3.1 grams (2.4 parts by weight) of α-tocopheryl acetate.

40 milliliters (30 parts by weight) of water were then gradually added to the warm solution with continuous stirring at 75° C. until the mixture was completely dispersed. A visibly clear solution resulted. This solution remained clear even after storage for three months at 0° C.

Examples 2–8

These examples further illustrate the preparation of high potency vitamin E water-soluble compositions according to this invention. These compositions, it will be observed, formed stable aqueous solutions upon addition of water thereto.

High potency vitamin E preparations were made up in accordance with the general procedure of Example 1. The formulations of these preparations and observations made on water solutions thereof are set out in the following table.

| Ex. No. | Water Soluble Preparation | | | | Water | | Storage Conditions | Appearance at End of Storage Period |
|---|---|---|---|---|---|---|---|---|
| | α-Tocopheryl Polyoxyethylene Glycol (1000) Succinate | | α-Tocopheryl Acetate | | | | | |
| | Grams | Parts by Weight | Grams | Parts by Weight | Milliliters | Parts by Weight | | |
| 2 | 7.5 | 7.7 | 2.3 | 2.3 | 40 | 41 | 3 months, 0° | clear. |
| 3 | 6 | 9.0 | 0.6 | 1.0 | 43.4 | 66 | 2 weeks, 0° | Do. |
| 4 | 3 | 9.0 | 0.3 | 1.0 | 46.7 | 142 | 2 weeks, 0° and 37° | Do. |
| 5 | 3 | 8.7 | 0.46 | 1.3 | 46.4 | 134 | do | Do. |
| 6 | 3 | 8.5 | 0.55 | 1.5 | 46.4 | 131 | do | Do. |
| 7 | 3 | 8.0 | 0.74 | 2.0 | 46.3 | 124 | do | Do. |
| 8 | 3 | 7.7 | 0.92 | 2.3 | 46.1 | 118 | do | very slightly hazy. |

Example 9

This example illustrates the preparation of water-soluble composition according to this invention, which has both high vitamin A and high vitamin E potencies, and which forms a stable aqueous solution when mixed with water.

A solution of vitamin A palmitate in α-tocopheryl polyoxyethylene glycol (1000) succinate was prepared by stirring with slight warming on a steam bath 0.922 gram (1.0 part by weight) of vitamin A palmitate and 8.3 grams (9.0 parts by weight) of α-tocopheryl polyoxyethylene glycol (1000) succinate.

A 5 gram (5.9 parts by weight) portion of this solution was dissolved in 80 milliliters (94.1 parts by weight) of water containing 0.4 milligram of citric acid (to bring the pH to 4.5). A clear yellow solution containing 10,000 units of vitamin A per milliliter (as determined by U.V. absorption) and the equivalent of 12.8 milligrams of α-tocopherol per milliliter was obtained. This aqueous solution remained clear even after three months' storage at room temperature and less than 10% loss of vitamin A activity over this period occurred.

Example 10

This example illustrates the preparation of still another water-soluble composition according to this invention, which has a more concentrated vitamin A potency than the preparation of Example 9.

A vitamin A solution was prepared by dissolving 1.4 grams (1.8 parts by weight) of vitamin A palmitate having a vitamin activity of 1,700,000 units per gram in 6.26 grams (8.2 parts by weight) of α-tocopheryl polyoxyethylene glycol (1000) succinate.

The water-solubilized, fat-soluble vitamin preparation was then admixed with 40 milliliters (52.1 parts by weight) of water. This gave a clear aqueous solution containing 50,000 units of vitamin A per milliliter and the equivalent of 38 milligrams of α-tocopherol per milliliter.

Thus, I have provided a fat-soluble, vitamin preparation which is readily water-soluble. In addition, I have provided stable, clear, highly potent, aqueous solutions of fat-soluble, vitamins. Other embodiments, benefits and features of advantage will be readily apparent to those in exercise of ordinary skill in the art upon reading the foregoing disclosure. In this regard this invention in its broadest aspects encompasses water soluble preparations generally, and water solutions thereof, which comprise a water-insoluble, fat-soluble substance and a highly water-soluble, vitamin E-active, tocopherol derivative, particularly the defined, highly water soluble, vitamin E active, polyoxyethylene glycol ester of a tocopheryl ester of a dicarboxylic acid. Representative of other specific water-insoluble, fat soluble substances in such preparations are glycerides, sterols and carotenoids. All embodiments of this invention including all variations and modifications thereof embracing the spirit and essential characteristics of this invention are intended to be within the scope of the claimed subject matter unless expressly excluded by claim language.

I claim:

1. A water-soluble preparation comprising a water-insoluble, fat-soluble vitamin composition at a concentration in a range from about one to about three parts by weight and a vitamin E-active, polyoxyethylene glycol ester of a tocopheryl ester of succinic acid wherein the polyoxyethylene glycol moiety of the ester has a molecular weight in a range from about 600 to about 6000, the concentration of said ester being in a range from about seven to about nine parts by weight.

2. A stable, clear, aqueous solution comprising at least about thirty parts by weight of water and a water-soluble preparation consisting essentially of from about one to about three parts by weight of a water-insoluble, fat-soluble vitamin composition and from about seven to about nine parts by weight of a highly water-soluble, vitamin E-active, polyoxyethylene glycol ester of a tocopheryl ester of succinic acid wherein the polyoxyethylene glycol moiety of the ester has a molecular weight in a range from about 600 to about 6000.

3. A stable, clear, aqueous solution comprising at least about thirty parts by weight of water and a water-soluble, high potency vitamin E preparation consisting essentially of from about one to about three parts by weight of α-tocopheryl acetate and from about seven to about nine parts by weight of a polyoxyethylene glycol ester of α-tocopheryl succinate wherein the polyoxyethylene glycol moiety of the molecule has an average molecular weight of about 1000.

4. A water-soluble, high potency, vitamin E preparation consisting essentially of from about one to about three parts by weight of α-tocopheryl acetate and from about seven to about nine parts by weight of a polyoxyethylene glycol ester of a α-tocopheryl succinate wherein the polyoxyethylene glycol moiety of the molecule has an average molecular weight of about 1000.

5. A stable, clear, aqueous solution comprising at least about six parts by weight of water and a water-soluble, high potency, vitamins A and E preparation consisting essentially of from about one to about three parts by weight of vitamin A palmitate and from about seven to about nine parts by weight of a polyoxyethylene glycol ester of α-tocopheryl succinate wherein the polyoxyethylene glycol moiety of the molecule has an average molecular weight of about 1000.

6. A water-soluble, high potency, vitamins A and E preparation consisting essentially of from about one to about three parts by weight of vitamin A palmitate and from about seven to about nine parts by weight of a polyoxyethylene glycol ester of α-tocopheryl succinate wherein the polyoxyethylene glycol moiety of the molecule has an average molecular weight of about 1000.

7. A process for preparing a water-soluble preparation comprising a water-insoluble, fat-soluble vitamin composition, which comprises: melting from about seven to about nine parts by weight of α-tocopheryl polyoxyethylene glycol (1000) succinate and then admixing therewith from about one to about three parts by weight of said water-insoluble, fat-soluble vitamin composition.

8. A process for preparing a water-soluble preparation comprising vitamin A palmitate, which comprises: melting from about seven to about nine parts by weight of α-tocopheryl polyoxyethylene glycol (1000) succinate and then admixing therewith from about one to about three parts by weight of said vitamin A palmitate.

9. A process for preparing a water-soluble preparation comprising α-tocopheryl acetate, which comprises: melting from about seven to about nine parts by weight of α-tocopheryl polyoxyethylene glycol (1000) succinate and then admixing therewith from about one to about three parts by weight of said α-tocopheryl acetate.

10. A process for preparing a stable, clear, aqueous solution of vitamin A palmitate which comprises: melting from about seven to about nine parts by weight of α-tocopheryl polyoxyethylene glycol (1000) succinate; admixing therewith from about one to about three parts by weight of vitamin A palmitate, whereby a water-soluble preparation is formed, and then admixing said water-soluble preparation with water at a concentration of at least about six parts by weight of water for every ten parts by weight of said water-soluble preparation.

11. A process for preparing a stable, clear, aqueous solution of an α-tocopheryl acetate which comprises: melting from about seven to about nine parts by weight of α-tocopheryl polyoxyethylene glycol (1000) succinate; admixing therewith from about one to about three parts by weight of an α-tocopherol acetate, whereby a water-soluble preparation is formed, and then admixing said water-soluble preparation with water at a concentration of at least about thirty parts by weight of water for every ten parts by weight of said water-soluble preparation.

References Cited in the file of this patent

UNITED STATES PATENTS

| | | |
|---|---|---|
| 2,680,749 | Cawley et al. | June 8, 1954 |
| 2,816,855 | Sobel | Dec. 17, 1957 |